United States Patent Office 2,705,668
Patented Apr. 5, 1955

---

2,705,668

PRINTING WITH INDIGOID VAT DYESTUFFS AND COMPOSITIONS THEREFOR

Maurice H. Fleysher, Buffalo, N. Y., assignor to Allied Chemical & Dye Corporation, New York, N. Y., a corporation of New York No Drawing. Application April 29, 1952, Serial No. 285,055

16 Claims. (Cl. 8—70)

This invention relates to the field of printing of textiles with vat dyestuffs of the indigoid class by means of copper plates, rolls, etc., the term "indigoid class" being employed in the broad sense and including, among others, symmetrical and unsymmetrical vat dyestuffs derived from indole (indigo dyestuffs) and/or thionaphthen (thioindigo dyestuffs) and/or coumarone. It relates more particularly to improvements in the dyestuff compositions applied to the copper surfaces of printing means employed in the printing, whereby objectionable effects, heretofore produced, are suppressed or substantially eliminated.

The coloring of textile fabrics with the aid of indigoid vat dyestuffs by the printing process generally involves applying a so-called "printing paste" (a composition containing particles of the unreduced vat dyestuff in admixture with a thickened gum or adhesive paste) to the fabric in the form of a design (usually by means of an engraved copper roll) and then subjecting the thus-printed fabric to further treatments to fix the dye and finish the fabric. In general, vat dye printing pastes contain, in addition to the unreduced vat dyestuff and thickened adhesive, substances (such as, sodium formaldehyde-sulfoxylate and potassium carbonate) which effect reduction, or cause only partial reduction of the dyestuff under the conditions of the printing operation but which in the subsequent operations (such as application of heat and/or steam) react with the dyestuff to convert it to the soluble form, and other substances or assistants which promote the reduction of the dyestuff and/or absorption of the reduced dyestuff by the fiber. In some cases, as in printing with difficultly reducible vat dyes, the vat dyestuff in the printing paste is subjected to a preliminary partial reduction before applying the printing paste to the fabric.

Thus a typical printing procedure employing a commercial indigoid vat dyestuff paste (of which about 10 to about 25 percent is dyestuff and the remainder is mainly water) involves mixing the commercial indigoid vat dyestuff paste with a stock printing thickener to form a uniform printing paste; printing a cotton fabric with the resulting printing paste by means of an engraved copper roll; drying the printed fabric to set the design; and subjecting the printed fabric to the action of air-free saturated steam at 100°–102° C. for three to five minutes; rinsing the fabric in cold water and soaping at boiling temperature in the presence of air (whereby the reduced vat dyestuff is oxidized back to the insoluble form), until the gum and other thickening and unreacted material are removed and the color is fully developed; and then rinsing and drying.

The use of copper printing surfaces in the printing of textiles with indigoid vat dyestuffs has the disadvantage that many indigoid vat dyestuff printing pastes cause a change in copper printing surfaces (hereinafter called "tarnishing" or "tarnish") which interferes with the obtainment of satisfactory prints. The cause and nature of said tarnish are not known. In some cases it manifests itself as a staining or discoloring of the copper surface; in other cases it manifests itself as a deposit of a difficultly removable color film; in still others it seems to be a combination of both. Sometimes it appears to be a modification of the copper-surface—caused by a reaction of the printing paste with the copper; at other times it appears to be caused by a bonding of particles of the dyestuff to the copper surface, possibly by reaction with the copper.

Whatever the cause and nature, the tarnish in time builds up sufficiently to interfere seriously with the printing, by causing uneven action of the "doctor" blade and/or by filling depressions in intaglio printing rolls to such an extent that the design is blurred or even obliterated. The tenacity with which the tarnish adheres to copper printing surfaces required such drastic treatment for its removal that costly reconditioning and re-engraving are usually required to restore the printing surfaces to usable condition.

The said tarnishing is not limited to any particular type of indigoid vat dyestuff, but manifests itself in connection with various types thereof. Furthermore, it does not manifest itself in the case of all indigoid vat dyestuffs, nor in the case of all batches of the same indigoid vat dyestuff manufactured by the same standard method of manufacture. It will be understood that, in referring to "indigoid vat dyestuffs" herein, the technical or commercial products and not chemically pure individuals are meant.

It is not known whether tarnishing is caused by components present in the indigoid vat dyestuff compositions or by their reaction with other components incorporated with the vat dyestuffs into the final printing pastes. As a result of many observations, it appears that some impurity associated with the indigoid vat dyestuff in the original dyestuff composition from which the printing paste is prepared is responsible for such tarnishing, but the true cause and nature of said tarnish have not been established.

The tendency of a particular batch of indigoid vat dyestuff to cause tarnishing can be readily determined, however, by preparing a test printing paste of the dyestuff and evaluating the tarnishing effect of the test printing paste on a polished copper plate. Thus, a suitable test printing paste can be prepared, for example, by thoroughly mixing the indigoid vat dyestuff to be tested, in the form of a dyestuff paste, with a suitable thickener (such as a printing thickener of the type described below) in proportions such that the resulting printing paste contains 26 ounces by weight of dyestuff paste (2.6 ounces of dyestuff, in the case of a 10% dyestuff paste) per gallon of printing paste, spreading a portion of the resulting test printing paste on a polished copper surface, and after letting it remain for 10 minutes (or other suitable test period) removing the paste by washing with tepid water. The degree of tarnishing is then determined by inspection of the plate, and evaluated in terms of the following scale of progressively increasing tarnish: substantially none; slight; appreciable; considerable; heavy.

An object of the present invention is to provide a method of suppressing the tarnishing action on copper of a vat dye printing paste containing a copper-tarnishing indigoid vat dyestuff.

A further object of the present invention is to produce an indigoid vat dye printing paste having little tarnishing action on copper printing surfaces from indigoid vat dystuff compositions which cause tarnishing of copper.

An additional object of the present invention is to provide a vat dyestuff composition adapted for use in textile printing comprising a copper-tarnishing indigoid vat dyestuff and a tarnish suppressor.

Another object of the present invention is to provide vat dyestuff compositions in the form of dyestuff pastes, powders, flakes, or the like, containing a copper-tarnishing indigoid vat dyestuff in a form adapted for conversion to a printing paste and a tarnish suppressor, which compositions cause little tarnish when incorporated into vat dye printing pastes and applies to copper printing-surfaces.

A further object of the present invention is to provide a non-tarnishing indigoid vat dyestuff printing paste for use in textile printing by means of engraved copper surfaces.

Other objects in part will be obvious and in part will appear hereinafter.

According to the present invention, the foregoing objects are accomplished and other advantages are secured by incorporating a novel class of tarnish suppressors into vat dye printing pastes (or into vat dyestuff compositions to be employed in the preparation of printing pastes) which contain copper-tarnishing indigoid vat dyestuffs.

The tarnish suppressors employed in the practice of the present invention are copper chelates (complexes) of chelate-forming (metal sequestering) polycarboxy amines having at least two carboxymethyl radicals (in the free acid or salt form) directly linked to a basic nitrogen atom. Polycarboxyamines of this type include amino polycarboxylic acids (for example, iminodiacetic acid, methyliminodiacetic acid, nitrilotriacetic acid, ethylenediamine tetra-acetic acid, anthranilic acid diacetic acid, aminomalonic acid diacetic acid, and uramildiacetic acid) and salts thereof which form water-soluble copper chelates, and especially salts in which one or more of the hydrogen atoms of the carboxyl groups are replaced by the same or different alkali metals or ammonium or organic ammonium radicals. Preferably the tarnish suppressor is a water-soluble copper chelate of N,N,N′,N′-tetra-carboxymethyl ethylenediamine (which is referred to hereinafter and in the claims as "tetra-carboxymethyl ethylenediamine") and especially in the form of a sodium salt.

I have discovered that the tarnishing action of indigoid vat dyestuffs which cause tarnishing of copper to an objectionable degree can be suppressed to a considerable extent, and in some cases substantially completely, by incorporating a copper chelate of said type, and especially a copper chelate of tetra-carboxymethyl ethylenediamine, into a vat dye printing paste containing such an indigoid vat dyestuff. I have discovered, furthermore, that the incorporation of such copper chelate into an indigoid vat dye printing paste can be readily accomplished by incorporating a small amount of each of a suitable water-soluble copper salt (such as, copper sulfate or copper acetate) and a water-soluble salt of an amino polycarboxylic acid of the type referred to above (such as tetrasodium ethylenediamine tetra-acetate) into an indigoid vat dye printing paste which causes tarnishing of copper, or into one or more of the components which go to make up the printing paste.

This result is surprising, because the employment of either the water-soluble copper salt or the water-soluble amino polycarboxylic acid salt, without the other, usually accomplishes substantially no suppression of tarnish and produces only slight tarnish-suppressing action in most cases wherein a tarnish-suppressing effect is secured at all.

The exact nature of the copper chelates which function as tarnish suppressors in accordance with the invention is not known. Presumably they are copper complexes in which the copper is sequestered in soluble complex form, since the said amino polycarboxylic acids are sequestering agents (chelating agents) for heavy metals in neutral or alkaline aqueous solutions, as evidenced by the fact that a water-soluble derivative is formed by the reaction of copper sulfate with such an amino polycarboxylic acid salt as tetrasodium tetra-carboxymethyl ethylenediamine from which copper is not precipitated by the addition of alkali.

The tarnish suppressors can be incorporated into the vat dye printing pastes in any desired manner. In the practice of the present invention according to the preferred method of procedure, the incorporation of the tarnish suppressor into the indigoid vat dye printing paste is accomplished by forming the copper chelate of the polycarboxy amine in the printing paste, or in a component of such printing paste, by incorporating therewith a small amount of each of water soluble copper salt and water-soluble salt of amino polycarboxylic acid.

Various water-soluble copper salts which do not attack copper are useful in the preferred practice of the present invention. In general, they are copper salts of non-oxidizing acids (inorganic or organic), as for example, the normal (that is, non-basic) cupric salts of sulfuric, hydrochloric, acetic, formic and citric acids. Copper sulfate is preferred because of its relative availability, cheapness and outstanding effectiveness.

The water-soluble salts of amino polycarboxylic acids useful in the preferred practice of the present invention include the various water-soluble salts of the above acids. Thus, suitable water-soluble salts of ethylenediamine tetra-acetic acid are represented by the formula

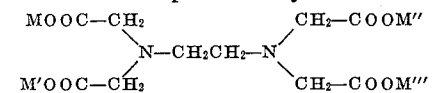

in which M, M′, M″ and M‴ represent the same or different cations imparting water solubility to the salts and especially alkali metals, ammonium, and organic ammonium radicals; such as, sodium, potassium, ammonium, mono-, di-, and tri-ethanolamine, the lower water-soluble alkylamines, and the quaternary lower alkylammonium hydroxides. The tetra-sodium salt is preferred since it is a readily available commercial product.

If desired, the polycarboxy amine (e. g., tetra-carboxymethyl ethylenediamine) may be employed in the form of the free acid or an acid salt, but inasmuch as the final printing compositions usually contain excess alkali, it will be present in the final printing composition in the form of a completely neutralized salt of the amino polycarboxylic acid.

The copper salt and polycarboxy amine can be incorporated with the printing paste in any suitable way. Thus, each may be added separately to the printing paste or they may be premixed and added to the printing paste; they may be added separately or jointly to the indigoid dyestuff composition (dyestuff paste, powder, flake, etc.) to be employed in preparing the printing paste, or to the thickener or other ingredients employed in making the printing paste; or one of them may be added to one of said components and the other to another of said components.

Vat dye printing pastes which are ready for application in printing processes do not come onto the market as such. They are compounded by the user, shortly before they are needed, from commercial vat dyestuff compositions with established standard contents of vat dyestuffs. Thus the user can prepare a printing paste at the specific color concentration desired, according to a favored private or published formula, which can include the utilization of one or more specially compounded thickeners and other ingredients. Indigoid vat dyestuffs come into the market in the form of aqueous dispersions or pastes containing the dyestuff, a small amount of dispersing agent, and in some cases, assistants; or they come into the market in the form of powders, grains, flakes, etc. containing the dyestuff, a dispersing agent and a suitable diluent (e. g., dextrine), with or without assistants. From the standpoint of simplicity and convenience, it is therefore preferred to incorporate the copper salt and polycarboxy amine salt into the dyestuff paste, powder, or other commercial composition during the course of its manufacture.

The amount of copper salt and salt of amino polycarboxylic acid employed in a given case will depend upon the tarnishing action of the particular indigoid vat dyestuff to be overcome. In general, at least an amount of copper salt equal to 0.13 atom of copper per mol of indigoid dyestuff present in the composition and at least sufficient polycarboxy amine to form a soluble chelate with said copper salt are required to accomplish effective suppression of tarnishing by a tarnish producing indigoid vat dyestuff. In the case of tetra-carboxymethyl ethylenediamine, at least 0.08 mol of ethylenediamine tetra-acetate is required per mol of indigoid dyestuff present in the composition. Lesser amounts tend to result in inadequate tarnish suppression. In some cases amounts up to about one-half atom of copper and about one-third mol of ethylenediamine tetra-acetate per mol of indigoid dyestuff may be required to secure maximum tarnishing suppression. Greater amounts are usually without additional effect and therefore wasteful.

The invention will be illustrated by the following specific examples in which parts are by weight and temperatures are in degrees centigrade. The printing thickener was prepared as follows:

PRINTING THICKENER A 3100 grams of KAC #4 gum (Stein Hall), 3600 grams of B-2 British gum (Stein Hall), and 5 liters of cold distilled water were mixed and, with further additions of cold water at about 10 minute intervals, were stirred to form a thoroughly uniform slurry occupying 26 liters.

The mixture was heated with stirring to between 75° and 85°, and stirred at such temperature for one hour. Immediately thereafter, 3600 grams of potassium carbonate (granular) were added and the mixture was cooled to 60°. Then 3600 grams of sodium formaldehyde sulfoxylate and 2 liters of glycerine were added to the agitated mass, which was then diluted with cold water to 30 liters. The diluted mixture was cooled to 30°, agitated for about 20 hours, and the paste thus obtained was screened through sheeting.

*Example 1*

Eight portions, each weighing 100 parts, of a commercial dibrom-indigo dyestuff paste containing 25 percent by weight of dyestuff, which caused heavy tarnishing of copper when subjected to the foregoing test, were treated as follows:

Portion No. 1—nothing was added.
Portion No. 2—1 part of hydrated copper sulfate ($CuSO_4.5H_2O$) was added.
Portion No. 3—3 parts of hydrated copper sulfate were added.
Portion No. 4—1 part of hydrated copper acetate ($Cu(OOC.CH_3)_2.H_2O$) was added.
Portion No. 5—2 parts of hydrated copper acetate were added.
Portion No. 6—1 part of tetrasodium ethylenediamine tetra-acetate ($C_{10}H_{12}O_8N_2Na_4$) was added.
Portion No. 7—3 parts of tetrasodium ethylenediamine tetra-acetate were added.
Portion No. 8—2 parts of hydrated copper sulfate and 2 parts of tetrasodium ethylenediamine tetra-acetate were added.

All additions were thoroughly incorporated to insure uniform mixtures.

Each portion was then mixed with such a quantity of Printing Thickener A that the resulting eight mixtures were 26-ounce printing pastes (i. e., a gallon of each of the mixtures would contain 26 ounces of original commercial vat dyestuff paste).

A part of each printing paste was spread on a separate area of a polished copper plate and left in contact with the copper for 10 minutes. The spots of pastes were then removed by washing with tepid water; and the contact areas were examined and compared for tarnishing. The results are summarized in Table I.

TABLE I

| Printing Paste from Portion | Agent Added | Amount added per 100 Parts of Dyestuff Paste | Mol Ratio Agent/ Dyestuff | Degree of Tarnish |
| --- | --- | --- | --- | --- |
| 1 | None | 0 | | Heavy. |
| 2 | $CuSO_4.5H_2O$ | 1 | 0.067 | Do. |
| 3 | $CuSO_4.5H_2O$ | 3 | 0.202 | Do. |
| 4 | $Cu(OOC.CH_3)_2.H_2O$ | 1 | 0.084 | Do. |
| 5 | $Cu(OOC.CH_3)_2.H_2O$ | 2 | 0.169 | Do. |
| 6 | $C_{10}H_{12}O_8N_2Na_4$ | 1 | 0.044 | Do. |
| 7 | $C_{10}H_{12}ON_2Na_4$ | 3 | 0.133 | Do. |
| 8 | { $CuSO_4.5H_2O$ | 2 | 0.134 | } Substantially none. |
|   | { $C_{10}H_{12}O_8N_2Na_4$ | 2 | 0.088 |   |

The printing pastes were then stored for 3 hours and for 72 hours, and after each period they were all spotted on polished copper. The results were substantially the same as those noted in Table I.

When employed for the printing of cotton cloth by the usual procedure, each of the fresh and stored printing pastes from portion 8 gave blue prints which were equal in all qualities of shade and strength of shade to those made from the corresponding printing paste obtained from portion 1. However, while the copper rolls used in the printings showed substantially no tarnishing from the application of the printing paste from portion 8, they were heavily tarnished after application of the printing paste from portion 1. These effects on the printing rolls by the printing pastes are in agreement with the results, shown in Table I, obtained by spotting the printing pastes on a polished copper surface.

*Example 2*

The procedures of Example 1 were repeated with Brilliant Indigo 4BR Paste—Color Index No. 1184 (a commercial tetrabrom-indigo dyestuff paste containing 23% by weight of dyestuff), which caused heavy tarnishing of copper when subjected to the foregoing test. The amounts of added agents were as follows:

Portion No. 1—none.
Portion No. 2—1 part of $CuSO_4.5H_2O$.
Portion No. 3—2.5 parts of $Cu_2SO_4.5H_2O$.
Portion No. 4—6 parts of $CuSO_4.5H_2O$.
Portion No. 5—2.5 parts of $C_{10}H_{12}O_8N_2Na_4$.
Portion No. 6—6 parts of $C_{10}H_{12}O_8N_2Na_4$.
Portion No. 7—2.5 parts of $CuSO_4.5H_2O$ and 2.5 parts of $C_{10}H_{12}O_8N_2Na_4$.
Portion No. 8—5 parts of $CuSO_4.5H_2O$ and 5 parts of $C_{10}H_{12}O_8N_2Na_4$.

The results are summarized in Table II.

TABLE II

| Printing Paste from Portion | Agent Added | Amount Added per 100 Parts of Dyestuff Paste | Mol Ratio Agent/ Dyestuff | Degree of Tarnish |
| --- | --- | --- | --- | --- |
| 1 | None | 0 | | Heavy. |
| 2 | $CuSO_4.5H_2O$ | 1 | 0.101 | Worse than No. 1. |
| 3 | $CuSO_4.5H_2O$ | 2.5 | 0.253 | Same as No. 1. |
| 4 | $CuSO_4.5H_2O$ | 6 | 0.607 | Do. |
| 5 | $C_{10}H_{12}O_8N_2Na_4$ | 2.5 | 0.166 | Considerable. |
| 6 | $C_{10}H_{12}O_8N_2Na_4$ | 6 | 0.397 | Same as No. 5. |
| 7 | { $CuSO_4.5H_2O$ | 2.5 | 0.253 | } Slight. |
|   | { $C_{10}H_{12}O_8N_2Na_4$ | 2.5 | 0.166 |   |
| 8 | { $CuSO_4.5H_2O$ | 5 | 0.515 | } Do. |
|   | { $C_{10}H_{12}O_8N_2Na_4$ | 5 | 0.332 |   |

The printing pastes, after being stored for 72 hours, were tested again for copper tarnishing. The results were substantially the same as those noted in Table II.

When employed for the printing of cotton cloth by the usual procedure, each of the fresh and stored printing pastes from portions 7 and 8 gave bright blue prints which, with respect to shade and strength of shade, were substantially equal to those obtained with the printing paste obtained from portion 1. However, the copper printing rolls which were heavily tarnished after application of the printing paste prepared from portion 1 showed barely perceptible tarnish after application of the printing pastes prepared from portions 7 and 8.

*Example 3*

The procedures of Example 2 were repeated with 8 portions, each weighing 100 parts, of Vat Brown G Paste (a commercial paste containing 18.5% by weight of 4,5,4',5'-dibenzo-thioindigo and small amounts of non-indigoid vat dyestuffs), which caused heavy tarnishing of copper when converted to a printing paste and tested in the manner set out above. The mol ratios of added agents, set out in Table III, were based on the thioindigo in the Vat Brown G Paste.

No noticeable tarnishing was produced by any of the 8 portions of printing paste when freshly prepared and after storage for 3 hours. Thereafter, during storage, portions 1 through 5 progressively developed heavy tarnishing of the copper plate, while portions 6 through 8 produced only negligible tarnishing, even after storage for 96 hours, as shown in Table III.

TABLE III

| Printing Paste from Portion | Agent Added | Amount Added per 100 Parts of Dyestuff Paste | Mol Ratio Agent/ Dyestuff | Degree of Tarnish after 96 Hours |
| --- | --- | --- | --- | --- |
| 1 | None | 0 | | Heavy. |
| 2 | $CuSO_4.5H_2O$ | 1.17 | 0.101 | Do. |
| 3 | $CuSO_4.5H_2O$ | 2.95 | 0.253 | Do. |
| 4 | $CuSO_4.5H_2O$ | 7.1 | 0.607 | Do. |
| 5 | $C_{10}H_{12}O_8N_2Na_4$ | 3.13 | 0.166 | Do. |
| 6 | $C_{10}H_{12}O_8N_2Na_4$ | 7.5 | 0.397 | Slight. |
| 7 | { $CuSO_4.5H_2O$ | 2.95 | 0.253 | } Do. |
|   | { $C_{10}H_{12}O_8N_2Na_4$ | 3.13 | 0.166 |   |
| 8 | { $CuSO_4.5H_2O$ | 6.0 | 0.515 | } Do. |
|   | { $C_{10}H_{12}O_8N_2Na_4$ | 6.25 | 0.332 |   |

When employed for the printing of cotton cloth by the usual procedure, each of the fresh and stored printing pastes from portions 7 and 8 gave bright brown prints which with respect to shade, and strength of shade were substantially equal to those obtained with the printing paste from portion 1. However, the copper printing rolls were heavily tarnished by the 96 hour old printing pastes derived from portions 1 through 5, appreciably tarnished by that derived from portion 6, and slightly tarnished by those derived from portions 7 and 8.

Similar tarnish suppressing effects may be secured by substituting in the above examples a corresponding amount, on a molar basis, of tetrasodium(2-hydroxy-1,3-propanyldinitrilo)-tetra-acetate, or trisodium nitrilotri-acetate, or tetrasodium amino-malonatediacetate, or disodium uramildiacetate, or a mixture of these salts.

It will be realized by those skilled in the art that the invention is not limited to the above specific examples and that changes can be made without departing from the scope of the invention.

Thus, instead of the indigoid vat dyestuffs employed in the above specific examples, any other indigoid vat dyestuff composition which causes tarnishing of copper and which is usable for printing, as is or after reduction, or which is adapted to be incorporated into a printing paste, can be treated with small amounts of a copper salt and a water-soluble salt of tetra-carboxymethyl ethylenediamine or others of said chelate-forming polycarboxy amines or can have incorporated therewith a small amount of a copper chelate of tetra-carboxymethyl ethylenediamine or a related copper chelate of said other complex-forming polycarboxy amines, to suppress tarnishing.

Illustrative additional indigoid vat dyestuffs are:

Vat Orange R_____ Color Index No. 1217.
Vat Red Violet RH_____ Color Index No. 1212.
5,5'-dichlor-7,7'-dibrom-indigo___ Color Index No. 1188.
Brilliant Indigo 4G _____ Color Index No. 1189.
Brilliant Indigo B_____ Color Index No. 1190.
Vat Scarlet G_____ Color Index No. 1228.
Vat Violet R_____ Color Index No. 1222.
Vat Green G_____ Color Index No. 1199.
Vat Pink (6,6'-dichlor-4,4'-dimethyl-2,2'-bis-thionaphthenindigo).
Vat Pink BG_____ Color Index No. 1210.
Vat Yellow G_____ Color Index No. 1196.
Vat Yellow R_____ Color Index No. 1170.

I claim:

1. In the printing of textile fabrics with indigoid vat dyestuffs by means of copper printing surfaces, the improvement which comprises suppressing the tarnishing action on copper of an alkaline formaldehyde-sulfoxylate printing paste containing an indigoid vat dyestuff which, when incorporated into an alkaline formaldehyde-sulfoxylate printing paste, causes tarnishing of a polished copper surface by carrying out the printing with an alkaline formaldehyde-sulfoxylate printing paste containing a small amount of a copper chelate of a chelate-forming polycarboxy amine having at least two carboxymethyl radicals directly linked to a basic nitrogen atom through the methyl carbon atoms, the amount of said copper chelate being at least sufficient to suppress tarnishing of the copper surface.

2. In the printing of textile fabrics with indigoid vat dyestuffs by means of copper printing surfaces, the improvement which comprises suppressing the tarnishing action on copper of an alkaline formaldehyde-sulfoxylate printing paste containing an indigoid vat dyestuff which, when incorporated into an alkaline formaldehyde-sulfoxylate printing paste, causes tarnishing of a polished copper surface by carrying out the printing with an alkaline formaldehyde-sulfoxylate printing paste containing a copper chelate of a sodium salt of an amino polycarboxylic acid selected from the group consisting of iminodiacetic acid, methyliminodiacetic acid, nitrilotriacetic acid, ethylenediamine tetra-acetic acid, anthranilic acid diacetic acid, aminomalonic acid diacetic acid, and uramildiacetic acid the amount of said copper chelate corresponding with at least 0.13 atom of copper per mol of indigoid vat dyestuff in the printing paste.

3. In the printing of textile fabrics with indigoid vat dyestuffs by means of copper printing surfaces, the improvement which comprises suppressing the tarnishing action on copper of an alkaline formaldehyde-sulfoxylate printing paste containing an indigoid vat dyestuff which, when incorporated into an alkaline formaldehyde-sulfoxylate printing paste, causes tarnishing of a polished copper surface by carrying out the printing with an alkaline formaldehyde-sulfoxylate printing paste containing a copper chelate of a sodium salt of ethylenediamine tetra-acetic acid, the amount of said copper chelate corresponding with at least 0.13 atom of copper per mol of indigoid vat dyestuff in the printing paste.

4. A method of suppressing the tarnishing action on copper of an alkaline formaldehyde-sulfoxylate printing paste containing an indigoid vat dyestuff which, when incorporated into an alkaline formaldehyde-sulfoxylate printing paste, causes tarnishing of a polished copper surface, which comprises incorporating into such a printing paste a small amount of a water-soluble copper salt which does not attack copper, and a small amount of a water-soluble salt of ethylenediamine tetra-acetic acid.

5. A method of suppressing the tarnishing action on copper of an alkaline formaldehyde-sulfoxylate printing paste containing an indigoid vat dyestuff which, when incorporated into an alkaline formaldehyde-sulfoxylate printing paste, causes tarnishing of a polished copper surface, which comprises incorporating into such a printing paste an amount of a water-soluble copper salt of a non-oxidizing acid corresponding with at least 0.13 atom of copper per mol of indigoid vat dyestuff and an amount of an alkali metal salt of ethylenediamine tetra-acetic acid corresponding with at least 0.08 mol thereof per mol of indigoid vat dyestuff.

6. A method as defined in claim 4, wherein the copper salt is copper sulfate.

7. A method as defined in claim 5, wherein the copper salt is copper sulfate and the alkali metal salt is tetrasodium ethylenediamine tetra-acetate.

8. An indigoid vat dyestuff composition comprising an indigoid vat dyestuff which, when incorporated into an alkaline formaldehyde-sulfoxylate printing paste, causes tarnishing of a polished copper surface and, as a tarnish suppressor, a small amount of a copper chelate of a polycarboxy amine having at least two carboxymethyl radicals linked to a basic nitrogen atom through the methyl carbon atoms.

9. An indigoid vat dyestuff composition comprising an indigoid vat dyestuff which, when incorporated into an alkaline formaldehyde-sulfoxylate printing paste, causes tarnishing of a polished copper surface and, as a tarnish suppressor, a small amount of a water-soluble copper chelate of tetra-carboxymethyl ethylenediamine.

10. An indigoid vat dyestuff composition as defined in claim 8, wherein the tarnish suppressor is derived from a water-soluble copper salt which does not attack copper and a water-soluble salt of a chelate-forming amino polycarboxylic acid having at least two carboxymethyl radicals linked to a basic nitrogen atom through the methyl carbon atoms.

11. An indigoid vat dyestuff composition adapted to be incorporated into a printing paste for printing textile fabrics, comprising an indigoid vat dyestuff which, when incorporated into an alkaline formaldehyde-sulfoxylate printing paste, causes tarnishing of a polished copper surface and, as a tarnish suppressor, a water-soluble copper chelate of a polycarboxy amine selected from the group consisting of iminodiacetic acid, methyliminodiacetic acid, nitrilotriacetic acid, ethylenediamine tetra-acetic acid, anthranilic acid diacetic acid, aminomalonic acid diacetic acid, uramildiacetic acid and salts thereof.

12. An indigoid vat dyestuff composition as defined in claim 11, wherein the tarnish suppressor is derived from a water-soluble copper salt of a non-oxidizing acid in an amount corresponding with at least 0.13 atom of copper per mol of indigoid vat dyestuff and an alkali metal salt of ethylenediamine tetra-acetic acid in an amount corresponding with at least 0.08 mol thereof per mol of indigoid vat dyestuff.

13. An indigoid vat dyestuff composition as defined in claim 12 wherein the copper salt is copper sulfate and the alkali metal salt is tetrasodium ethylenediamine tetra-acetate.

14. An indigoid vat dye printing paste for printing textile fabrics, comprising an indigoid vat dyestuff which, when incorporated into an alkaline formaldehyde-sulfoxylate printing paste, causes tarnishing of a polished copper surface, a printing thickener, an alkali metal carbonate, formaldehyde-sulfoxylate and, as a tarnish suppressor, small amounts of a water-soluble copper salt which does not attack copper and a water-soluble salt of ethylenediamine tetra-acetic acid.

15. An indigoid vat dye printing paste for printing textile fabrics, comprising an indigoid vat dyestuff which, when incorporated into an alkaline formaldehyde-sulfoxylate printing paste, causes tarnishing of a polished copper surface, a printing thickener, potassium carbonate, sodium formaldehyde-sulfoxylate and, as a tarnish suppressor, an amount of a water-soluble copper salt of a non-oxidizing acid corresponding with at least 0.13 atom of copper per mol of indigoid vat dyestuff and an amount of an alkali metal salt of ethylenediamine tetraacetic acid corresponding with at least 0.08 mol thereof per mol of indigoid vat dyestuff.

16. An indigoid vat dye printing paste as defined in claim 15, wherein the copper salt is copper sulfate and the alkali metal salt is tetrasodium ethylenediamine tetraacetate.

References Cited in the file of this patent

"The Modern Chelating Agent—Versene," Technical Bulletin No. 1, 1949; published by Bersworth Chem. Co., Framingham, Mass.; pp. 1–5, 7, 8, 13.